United States Patent
Fehrenbacher et al.

(10) Patent No.: US 7,655,921 B2
(45) Date of Patent: Feb. 2, 2010

(54) DOSIMETER FOR THE DETECTION OF NEUTRON RADIATION

(75) Inventors: Georg Fehrenbacher, Mühital (DE); Georg Johannes Festag, Seeheim-Jugenheim (DE); Frank Gutermuth, Bensheim (DE); Torsten Radon, Ober-Mörlen (DE)

(73) Assignee: GSI Helmholtzzentrum fur Schwerionenforschung GmbH, Darmstadt (DE)

( * ) Notice: Subject to any disclaimer, the term of this patent is extended or adjusted under 35 U.S.C. 154(b) by 102 days.

(21) Appl. No.: 11/587,195

(22) PCT Filed: Apr. 9, 2005

(86) PCT No.: PCT/EP2005/003745

§ 371 (c)(1),
(2), (4) Date: Sep. 12, 2008

(87) PCT Pub. No.: WO2005/106532

PCT Pub. Date: Nov. 10, 2005

(65) Prior Publication Data

US 2009/0039279 A1 Feb. 12, 2009

(30) Foreign Application Priority Data

Apr. 22, 2004 (DE) .................. 10 2004 020 979

(51) Int. Cl.
*G01T 3/00* (2006.01)
(52) U.S. Cl. .................................. 250/390.03
(58) Field of Classification Search ............. 250/390.03
See application file for complete search history.

(56) References Cited

U.S. PATENT DOCUMENTS 2,920,204 A    1/1960    Youmans (Continued)

FOREIGN PATENT DOCUMENTS

DE    82 32 076.4    4/1983

(Continued)

OTHER PUBLICATIONS

Birattari, C. et al, "An extended range neutron rem counter," Nuclear Instruments and Methods in Physics Research, Elsevier Science Publishers B.V., North-Holland, A 297 (1990) pp. 250-257.

(Continued)

*Primary Examiner*—David P Porta
*Assistant Examiner*—Mindy Vu
(74) *Attorney, Agent, or Firm*—Harness, Dickey & Pierce, P.L.C.

(57) ABSTRACT

Disclosed is a dosimeter (1) for the detection of neutron radiation within an energy range of 0.025 eV to several hundred GeV, comprising a substantially spherical base body (3) which is used as a moderation body and which comprises hydrogenous material, a detection element (5) which is arranged in the center of the base body (3), and a neutron converter (7) surrounding the detection element (5). The neutron converter (7) comprises metal atoms which convert the energy of the high-energy neutron radiation essentially into neutrons within a suitable energy range. The dosimeter (1) is characterized in that the base body (3) is provided with an access (19) through which the detection element (5) can be introduced into the neutron converter (7) and removed thereform, and in that the neutron converter (7) is embodied in the form of a cylinder.

20 Claims, 2 Drawing Sheets

U.S. PATENT DOCUMENTS

Figure 1:
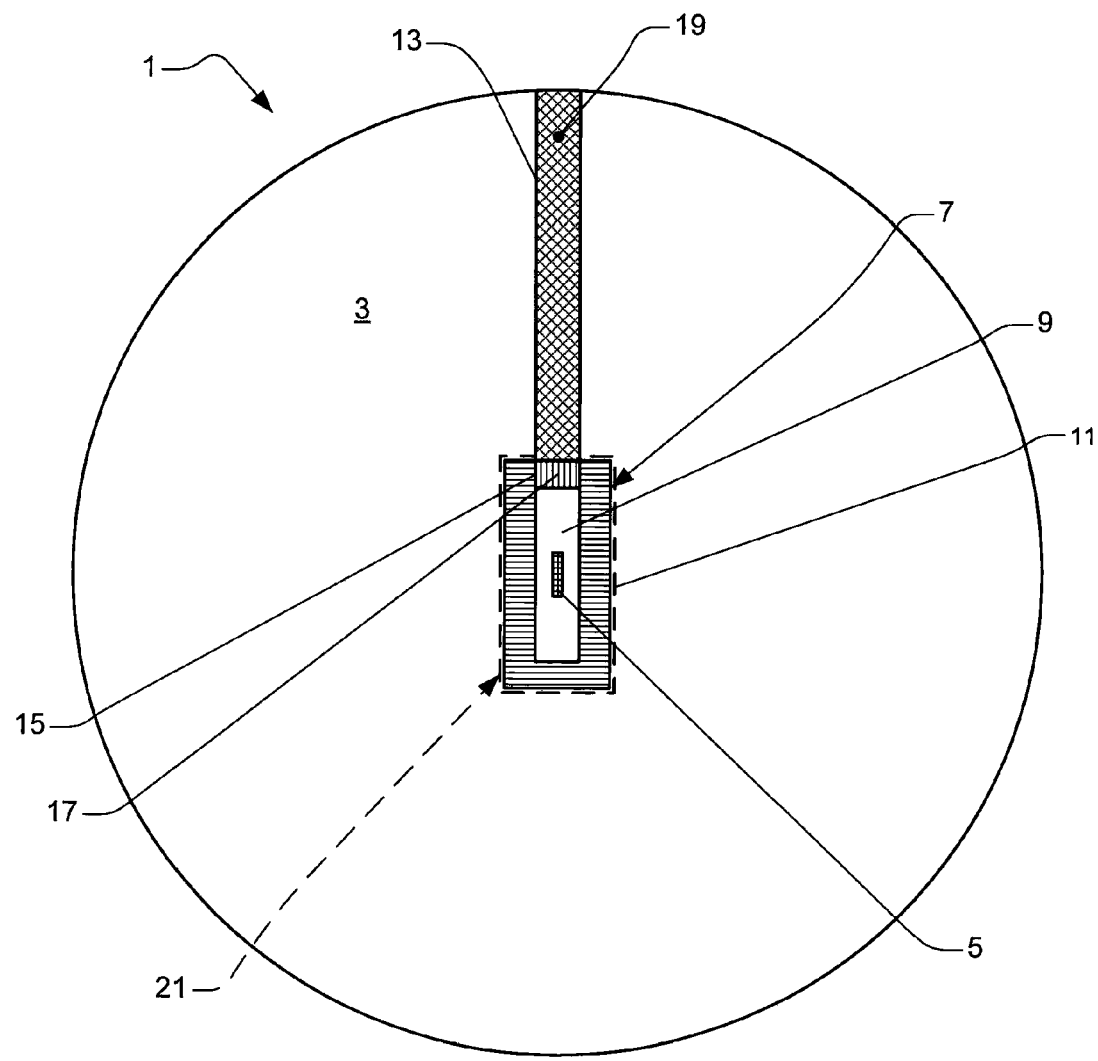

| | | | |
|---|---|---|---|
| 3,229,092 A | | 1/1966 | Eberline |
| 3,426,197 A | * | 2/1969 | Schwartzman et al. ...... 250/392 |
| 3,792,280 A | | 2/1974 | Piltingsrud |
| 3,885,159 A | | 5/1975 | Jahn et al. |
| 3,896,306 A | | 7/1975 | Becker et al. |
| 3,911,283 A | * | 10/1975 | Williams ................. 250/483.1 |
| 4,588,898 A | * | 5/1986 | Piesch et al. ........... 250/390.03 |
| 4,757,202 A | | 7/1988 | East et al. |
| 4,874,951 A | | 10/1989 | Gold et al. |
| 5,278,417 A | | 1/1994 | Sun |
| 5,578,830 A | | 11/1996 | Olsher et al. |
| RE35,908 E | | 9/1998 | Kitaguchi et al. |
| 6,362,485 B1 | | 3/2002 | Joyce et al. |
| 2006/0138345 A1 | | 6/2006 | Fehrenbacher |

FOREIGN PATENT DOCUMENTS

| | | |
|---|---|---|
| DE | 42 33 001 A1 | 4/1994 |
| DE | 196 27 264 C1 | 10/1997 |
| DE | 196 44 522 A1 | 5/1998 |
| DE | 101 32 550 A1 | 1/2003 |
| DE | 103 35 225 A1 | 2/2005 |

OTHER PUBLICATIONS

Leake, J. W., "An Improved Spherical Dose Equivalent Neutron Detector," Nuclear Instruments and Methods in Physics Research, North-Holland Publishing Co., 63 (1968) pp. 329-332.

Wernli, Christian, et al., "Neutron Dosimetry with Ion Chamber-Based DIS System," Rados Technology Oy, Turku, Finland, pp. 1-11.

Gutermuth, F. et al., "The response of various neutron dose meters considering the application at a high energy particle accelerator," Kerntechnik 68 (2003) 4.

Steurer, A. et al., "Uncertainties of measurements in radiation protection," Kerntechnik 68 (2003) 4.

* cited by examiner

DOSIMETER FOR THE DETECTION OF NEUTRON RADIATION

CROSS-REFERENCE TO RELATED APPLICATIONS

This application claims the benefit and priority of German Patent Application No. 10 2004 020 979.0, filed 22 Apr. 2004. This application is a National Stage of International Application No. PCT/EP2005/003745, filed on 9 Apr. 2005. The entire disclosure of each of the above applications are incorporated herein by reference.

FIELD

The invention relates to a dosimeter for the detection of neutron radiation in the energy range from 0.025 eV to several hundred GeV.

BACKGROUND

Accelerator facilities for research purposes and for use in the industrial and medical fields are employed to accelerate particles to extremely high energies. For example, in modern heavy ion accelerators, ions are accelerated to energies of several hundred GeV. These high-energy ions produce secondary radiation, meaning charged particles and neutrons, when they interact with material. The energy spectrum of the neutrons generated ranges from 0.025 eV up to several hundred GeV since the maximum energy of the neutrons generated can have the same energy range as the primary ion radiation. For protection against radiation it is necessary to detect the neutrons generated in order to dimension radiation protection measures, specifically shields, in such a way that prescribed limits can be met. Since high-energy neutrons have a long average path length in material, they can penetrate even extremely strong shields. So it is necessary and of great importance—in particular with heavy-ion therapy installations—to measure and monitor the neutron intensity (environmental monitoring). For radiation protection monitoring, it is important to develop dosimeters to verify neutron radiation which can be employed in the entire energy range of neutron radiation, from the range of thermal neutrons (0.025 eV) up to energies of several hundred GeV.

Dosimeters used here have a main body made of a hydrogenous material which is substantially spherical. A detection element is located in the center of the main body which detects the incident radiation. In order to be able to detect neutron radiation with extremely high energy, a neutron converter is provided which comprises metal atoms. They convert the neutrons to be detected into decelerated neutrons which lie in a suitable energy range of 0.025 eV to 1 keV so that they can be registered by the detection element. To evaluate the detected radiation, the detection element must be expanded. It has turned out that the construction of conventional dosimeters is complex and consequently monitoring the environment is possible only at relatively high cost.

SUMMARY

The object of the invention is therefore to create a dosimeter for the detection of neutron radiation which is simply constructed and thus permits economical environmental monitoring, that is to say, a dosimetric estimate of neutron radiation.

To achieve this objective, a dosimeter is proposed which has an essentially spherical main body with hydrogenous material acting as a moderating body and in the center of which a detection element is housed. A neutron converter surrounds the detection element. The neutron converter includes metal atoms for converting an energy of the high-energy neutrons to be detected essentially into neutrons in a suitable energy range. The dosimeter is characterized by the main body having an access through which the detection element can be reached. In this way it can be inserted into and removed from the neutron converter. The neutron converter is preferably of cylindrical configuration so that the detection element is easily accessible.

Additional embodiments can be found in the dependent claims.

DRAWINGS

The invention is explained in more detail in what follows with reference to the drawings.

Figure 2:
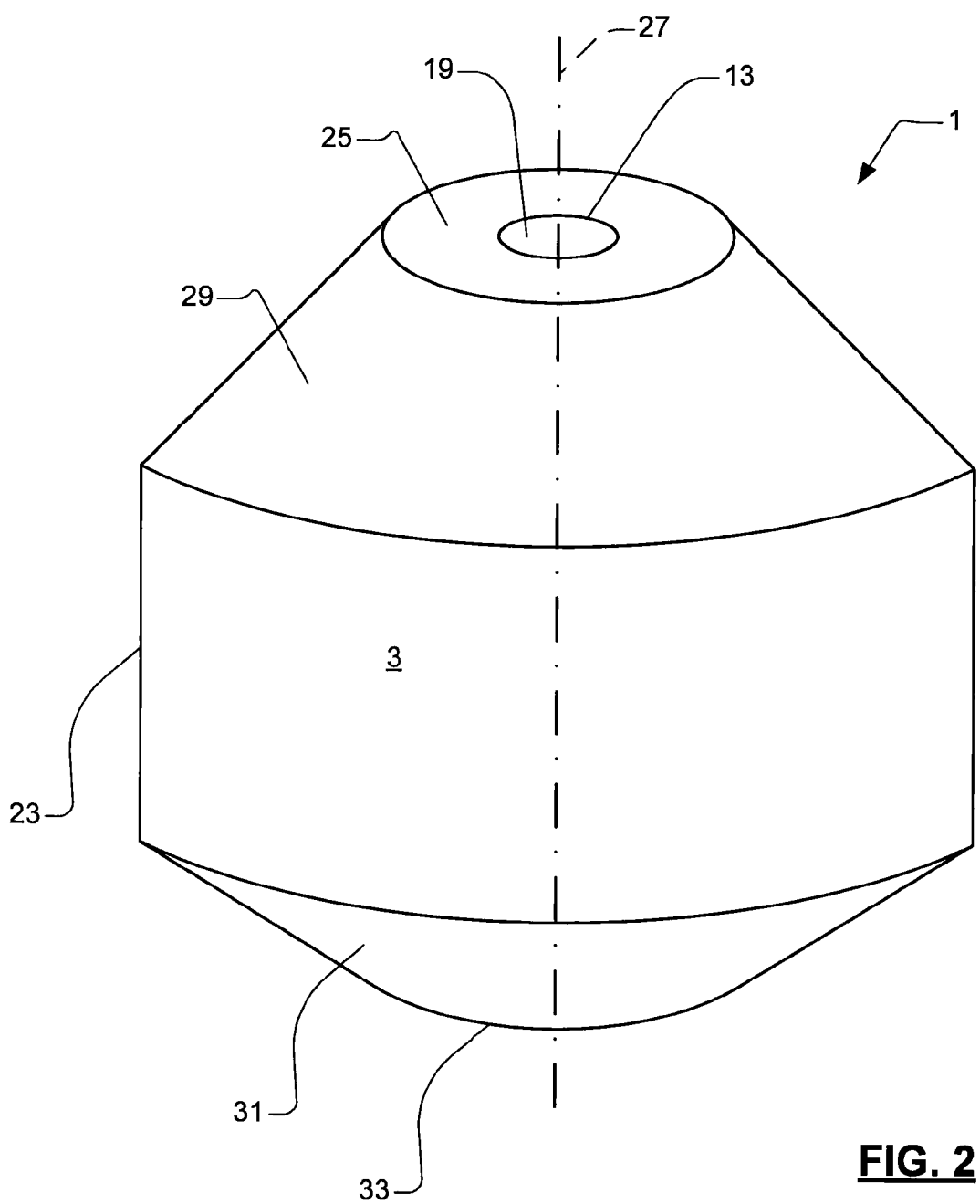

FIG. 1 shows a basic sketch of a first embodiment of a dosimeter in cross section; and FIG. 2 shows a basic sketch of a second embodiment of a dosimeter in a perspective view.

DETAILED DESCRIPTION

An embodiment of a dosimeter 1 can be seen in FIG. 1 which comprises a main body 3. The main body 3 here is spherical in configuration. It is also conceivable to use a polyhedron main body, the outer surface of which is composed of a multiplicity of flat areas. It is critical that the main body 3 is preferably constructed in such a way that it demonstrates essentially uniform moderating behavior for radiation from different directions.

The main body 3 acts as a moderating body and features a hydrogenous substance, from which the main body 3 is preferably produced. Hydrogenous plastics, in particular polyethylene (PE) and/or polymethyl methacrylate (PMMA) can be used as the base material, but also water and the like.

A detection element 5 is provided in the center of the main body 3 which can comprise at least one storage and at least one registration element. It serves to detect radiation penetrating the main body 3.

The detection element 5 is surrounded by a neutron converter 7 which is substantially cylindrical in configuration and surrounds the detection element 5. The neutron converter 7 also encloses a filler material 9 in which the detection element 5 is embedded. The detection element 5 is preferably housed in a slot introduced into the filler material 9 to make replacement simple.

The filler material 9 can also be configured as a moderating body and comprise a hydrogenous substance of the type addressed above or consist thereof.

The neutron converter 7 has a wall 11 which comprises metal atoms which have an atomic number Z>15, preferably Z>20. The wall 11 can comprise atoms of titanium, chromium, vanadium, iron, copper, wolfram, lead, and/or bismuth. It is essential that the metal atoms are stable in the sense of radioactivity. It is conceivable that metal atoms of different atomic numbers are provided in the wall 11. It is also possible to use metal atoms from alloys.

The neutron converter 7 preferably has at least two layers with metal atoms with different atomic numbers Z, wherein the layers can be structured such that essentially only metal atoms of a specific atomic number are provided per layer.

It is preferred that the layers be selected and oriented such that they contain metal atoms with decreasing atomic numbers when viewed from the side of the dosimeter 1 facing the neutron radiation.

It is also conceivable that at least one of the layers is configured as a metal film, preferably as a rolled metal film or as a polymer film with vapor deposition of metal.

The sequence of layers with metal atoms having different atomic numbers is preferably matched to the energy spectrum of the neutron radiation which is to be detected by the detection element 5.

In a particularly preferred embodiment, the wall 11 of the neutron converter 7 consists of lead with a thickness of from 0.5 to 2.0 cm. The height of the neutron converter 7 is preferably 8.0 to 15 cm and its outside diameter 1.0 to 5.0 cm.

An access 13 is introduced into the main body 3 of the dosimeter 1, which can be implemented, for example, as a hole. The detection element 5 can be inserted thereby into the interior of the dosimeter 1, in this case the neutron converter 7. It also serves for the removal of the detection element 5 for analysis.

In the transition area between the access 13 and the neutron converter 7 there is an opening 15 through which the interior of the neutron converter 7 is accessible. The filler material 9 is preferably configured such that it comprises metal atoms in the area of the opening 15 so that a quasi-cover 17 is realized which is structured like the wall 11 of the neutron converter 7.

When the dosimeter 1 is used, the access 13 is provided with a sealing body 19 which preferably fills it completely. The sealing body 19 preferably features the same material as the main body 3 or is made from it in order that incident radiation in the area of the access 13 undergoes moderation, just as in the remaining area of the main body 3.

From FIG. 1 it can also be seen that a neutron absorber 21 can be provided in addition which is positioned between main body 3 and detection element 5. In the embodiment shown here, the neutron absorber 21 is executed on the outside of the neutron converter 7 as an absorption layer and indicated by a broken line.

In principle it is also possible to locate the neutron absorber 21 in the interior of the neutron converter 7, for example on its inner wall.

The neutron absorber 21 preferably comprises boron atoms. In their place, or in addition, cadmium atoms can also be employed.

The neutron absorber 21 can also have several layers which are disposed externally or internally on the wall 11 of the neutron converter 7.

The detection element 5 can comprise at least one storage element and at least one registration element, wherein preferably at least one of the elements is designed as a passive element. For example, the detection element 5 can be designed such that at least one registration element converts the neutrons into charged particles which are then detected by the at least one storage element.

The storage element is, as an example, an inorganic crystal, preferably a thermoluminescent crystal. Preferably an LiF crystal is used. The storage element can also be designed as a nuclear track detector and preferably comprise an organic high-molecular polymer, specifically Makrofol or CR39. Finally, it is also possible to use an inorganic glass and/or an organic crystal for the storage element.

The storage element can also be designed as an active element and comprise a semi-conductor, preferably silicon. Specifically, a solid-body storage element, preferably a MOSFET transistor, can be used.

The registration element of the detection element 5 preferably has $^6$Li and/or $^{10}$B and/or $^{153,155,157}$Gd atoms arranged in a thin layer.

The dosimeter 1 can comprise a solid-body storage element, preferably a modified MOSFET transistor which is located in a housing, as the storage element for the detection element 5. In this arrangement, the housing has a compound—preferably designed as a thin layer—on the side facing the solid-body storage element, that means the inside, with $^6$Li and/or $^{10}$B and/or $^{153,155,157}$Gd atoms which acts as the registration layer. This layer represents a sensitive layer for decelerated (thermalized) neutrons. The intervening space between housing and solid-body storage element is filled with a gas. The solid-body storage element used here, in contrast to conventional solid-body storage elements (EEPROM storage elements), has an opening on the side of the oxide layer of the EEPROM facing the environment, so that its potential-free gate is in direct contact with the surrounding gas. The layer applied to the housing wall surrounding the MOSFET transistor generates charged particles when neutrons strike the detection element 5. They are registered and saved by the solid-body storage element. By selecting different materials for the layer, the neutron sensitivity of the dosimeter 1 can be adjusted for different requirements.

The storage and the registration element can comprise atoms to be activated by capturing neutrons, preferably gold and/or silver and/or cadmium.

The dosimeter 1 is used in locations where neutron radiation is to be detected and registered, for example in monitoring the environment of high-energy accelerators. Because of the construction of the dosimeter 1, it is possible to analyze neutron radiation with neutrons with very different energies, thermal neutrons of 0.025 eV but also neutrons of several hundred GeV. In tests it turned out that spheres with a diameter of 20 to 35 cm consisting of polyethylene are particularly good for use as the main body 3, while the neutron converter 7 has the wall 11 which consists preferably of 0.5- to 2.0-cm thick metal, specifically lead, and the filler body 9 is provided.

Thermal and slow neutrons diffuse through the main body 3 of the dosimeter 1 as far as the detection element 5 and trigger an exothermic reaction there. The thickness of the main body 3, and consequently the thickness of the moderating body, must be adjusted in such a way that on the one hand the sensitivity of the detection element 5 is sufficiently high for these neutrons, on the other hand too high a sensitivity to intermediate neutrons, neutrons of medium energy, must be avoided. This can preferably be achieved by the dosimeter 1 having the neutron absorber 21 which preferably comprises $^{10}$boron atoms, or materials containing $^{10}$boron.

Fast neutrons must first be braked in the main body 3 of the dosimeter 1 acting as a moderating body before they can be registered in the detection element 5. The overall diameter of the dosimeter 1 is crucial for the maximum of the verification curve for a specific neutron energy in the range of these fast neutrons.

Very fast neutrons, neutrons in the energy range of >10 MeV, can be detected by providing the neutron converter 7 which has metal atoms. Neutrons which strike a metal atom with many nucleons in the neutron converter 7 cause spallation, meaning evaporation of protons and neutrons. An intranuclear cascade is created in the nucleus of the metal atoms in which, in addition to protons, neutrons are emitted whose energy is less than that of the neutrons impinging on the dosimeter 1. The energy of the neutrons created is in the MeV range. Depending on the energy of the neutrons created, it is possible to detect them directly by means of the detection element 5 or in the filler body 9 following moderation of the neutrons.

In the area of the neutron converter 7, there can also be fragmentation as the result of neutrons striking the nuclei of the metal atoms in the wall 11 of the neutron converter 7. The metal atoms break up into several nuclei and subsequently lead to vaporization of particles. Neutrons are again created, whose energy is less than the energy of the neutrons impinging on the dosimeter 1.

Overall, it becomes clear that the neutron converter 7 is essential for high-energy neutrons because it results in high-energy neutrons being converted into decelerated (thermalized) neutrons in a suitable energy range so that they can be detected by the detection element 5 directly or following moderation in the filler body 9.

The dosimeter 1 described here is distinguished by the fact that neutrons in very different energy ranges can be detected. The sensitivity to neutrons of a specific energy can be determined by the selection of the thickness of the main body 3 acting as a moderating body but also by the selection of the material that the main body 3 contains or from which it is made. In addition, the thickness of the wall 11 of the neutron converter 7 is crucial. Beyond that, the material of the filler body 9 plays a part in calibrating the dosimeter 1 to detect neutrons of a specific energy.

Finally, one more optimizing absorber layer, the neutron absorber 21, can be provided for slow neutrons, the thickness of whose layer can be calibrated to the energy of the neutrons to be detected. At a specific thickness for the neutron absorber 21, holes can also be introduced into said absorber. The holes preferably constitute about 10% to 30% of the surface of the neutron absorber 21.

The dosimeter 1 of the type described here ultimately serves to detect neutrons in a broad energy range. It can also be introduced to detect neutron radiation in mixed radiation fields in which photon, neutron, and electron radiation are present. In this case, two isotopes are used for the detection element 5 with a neutron capture probability cross-section different by at least several orders of magnitude, preferably compounds having $^6$Li and $^7$Li and/or $^{10}$B and $^{11}$B atoms and/or $^{153,155,157}$Gd and $^{156,160}$Gd and/or $^{235}$U and $^{239}$Pu. For example, the probability cross-sections for $^{10}$B and $^{11}$B are different by six orders of magnitude (3840 barn, 5 mbarn).

The detection of neutron radiation in mixed radiation fields is carried out by means of a differential procedure. In this context, differential procedure means that the measured radiation intensities of at least two detection elements are subtracted. The detection elements are selected in such a manner that both measure the total radiation intensity, however one reacts sensitively to decelerated neutrons and the other does not react sensitively to decelerated neutrons. Thus, after subtracting the measured radiation intensities, the result is the radiation intensity for the neutron radiation.

$^6$LIFG and $^7$LiF crystals are particularly preferred as passive elements in the detection element 5 to realize thermoluminescent detectors.

It has turned out to be particularly advantageous that the dosimeter 1 can be configured as a passive dosimeter and that radiation fields which have pulsed radiation can also be monitored, where the radiation comprises neutrons in a very large energy range (0.025 eV to several hundred GeV). The construction of the dosimeter 1 ensures that measurement of the radiation dose takes place practically independent of direction.

FIG. 2 shows in a perspective view a further embodiment of the dosimeter 1. It is constructed identically to the one explained with reference to FIG. 1 so that reference is made to the preceding description of the dosimeter 1. Its operation is also identical.

The only difference is that the main body 3 is not configured as a sphere in this case. Its basic form starts with a cylinder, the two end faces of which are beveled in the transition area to the cylindrical outer surface of the main body 3.

The result is the main body 3 having an essentially cylindrically configured central first section 23 which comprises two mirror-image ends. An upper end 25 is flat in shape and forms a circular close-out surface perpendicular to a center axis 27 of the main body 3. The access 13, which has already been explained with reference to FIG. 1, opens into this surface. The sealing body 19, which was similarly explained above, is inserted into this access.

The upper end 25 makes a transition by way of a conical second section 29 into the cylindrical first section 23.

In the same way, a conical third section 31 adjoins the cylindrical first section 23, oriented and configured opposite to the second section 29. Starting from the cylindrical first section 23, it tapers towards the bottom and adjoins a lower end 33. This is formed by a circular close-out surface to which the center axis 27 is perpendicular. In this way, the lower end 33 runs parallel to the upper end 25.

The main body 3 of the dosimeter 1 is preferably configured in accordance with the embodiment from FIG. 2 in such a way that it is comparable in its moderating behavior with that of the main body 3 as it was explained with reference to the first embodiment from FIG. 1. It must be kept in mind that the production of the main body 3 can be carried out relatively inexpensively using the embodiment from FIG. 2. For example, a body which starts as a cylinder is beveled in the area of its ends so that conical sections result by way of which the cylindrical first section 23 transitions into the end faces which form the upper end 25 and the lower end 33 running perpendicular to the center axis 27.

The height of the conical sections 29 and 31 measured in the direction of the center axis 27 and the height of the cylindrical first section 23 can be varied within a broad framework and adapted to the desired moderation characteristics of the main body 3. In order to achieve moderation in the main body 3 in the second embodiment from FIG. 2 which is as directionally independent as possible, the shape of the main body 3 preferably corresponds in its rough outline to that of a cone.

The main body 3 explained with reference to FIG. 2 can also have a divergent contour. It is conceivable that the cylindrically configured central first section 23 has a generally curved outer contour which corresponds essentially to that of a sphere in the region of its equator. The second and third sections 29 and 31 do not have to be shaped exactly like a cone. Areas which are generally curved can be provided by way of which the first section 23 transitions into the upper end 25 and the lower end 33.

The dosimeter 1 from FIG. 2 is constructed identically on the inside to the dosimeter 1 from FIG. 1 so that reference is made to the description of the elements present there in accordance with FIG. 1.

For the rest, it follows that the method of operation of the dosimeter 1 from FIG. 2 is identical to that which was explained with reference to FIG. 1.

What is claimed is:

1. A dosimeter for the detection of neutron radiation in an energy range from approximately 0.025 eV to approximately several hundred GeV comprising:
   an essentially spherical main body with hydrogenous material acting as a moderating body;
   a detection element located in a center of the main body;
   a neutron converter surrounding the detection element, the neutron converter including metal atoms for converting an energy of the high-energy neutrons to be detected essentially into neutrons in a suitable energy range;
   wherein the main body has an access through which the detection element can be inserted into and removed from the neutron converter and the neutron converter is configured in a substantially cylindrical shape, the detection element including at least one storage element and at least one registration element.

2. The dosimeter of claim 1, wherein at least one of either of the at least one storage element and the at least one registration element is a passive element.

3. The dosimeter of claim 1, wherein the at least one storage element is selected from a group comprising an inorganic crystal, a thermoluminescent crystal, a nuclear track detector an inorganic glass and an organic crystal.

4. The dosimeter of claim 3, wherein the nuclear track detector is an organic high polymer.

5. The dosimeter of claim 1, wherein the at least one storage element has a semi-conductor.

6. The dosimeter of claim 5, wherein the semi-conductor has a solid-body storage element.

7. The dosimeter of claim 1, wherein the at least one registration element is selected from a group comprising $^6$Li, $^{10}$B and $^{153,155,157}$Gd atoms.

8. The dosimeter of claim 7, wherein the atoms are arranged in a thin layer.

9. The dosimeter of claim 1, wherein the at least one storage and the at least one registration element comprises atoms to be activated by capturing neutrons.

10. The dosimeter of claim 1, wherein the main body is a polyhedron body.

11. The dosimeter of claim 1, wherein the main body has a cylindrical first section abutted by tapering sections.

12. The dosimeter of claim 1, wherein the main body comprises hydrogenous material.

13. The dosimeter of claim 1, wherein at least one of a size of the main body and a thickness of the neutron converter is adapted to the energy spectrum of the neutron radiation to be detected.

14. The dosimeter of claim 1, wherein a neutron absorber is located in a thin layer between the main body and the detection element.

15. The dosimeter of claim 14, wherein the neutron absorber is positioned between the main body and the neutron converter.

16. The dosimeter of claim 14, wherein the neutron absorber is positioned between the neutron converter and the detection element.

17. The dosimeter of claim 14, wherein the neutron absorber has holes.

18. The dosimeter of claim 14, wherein the neutron absorber comprising boron and/or cadmium atoms.

19. A dosimeter for the detection of neutron radiation in mixed radiation fields having photon, neutron and electron radiation comprising:
   an essentially spherical main body with hydrogenous material acting as a moderating body;
   a detection element located in a center of the main body;
   a neutron converter surrounding the detection element, the neutron converter including metal atoms for converting an energy of high-energy neutrons to be detected essentially into neutrons in a suitable energy range;
   wherein the main body has an access through which the detection element can be inserted into and removed from the neutron converter and the neutron converter is configured in a substantially cylindrical shape, the detection element including at least one storage element and at least one registration element,
   wherein the detection element has two isotopes with a neutron capture probability cross-section different by at least several orders of magnitude.

20. The dosimeter of claim 19, wherein at least one of the at least one storage element and the at least one registration element includes at least one $^6$LiF crystal and at least one $^7$LiF crystal and/or compounds having $^{10}$B and $^{11}$B atoms.

* * * * *